Aug. 3, 1926.
J. L. KELLY ET AL
1,595,006
METHOD OF MANUFACTURING HOLLOW RUBBER ARTICLES
Filed Dec. 3, 1923
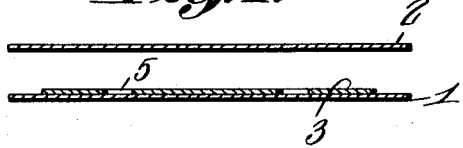
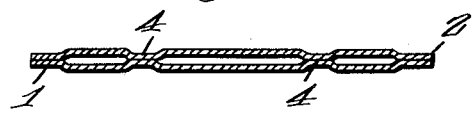
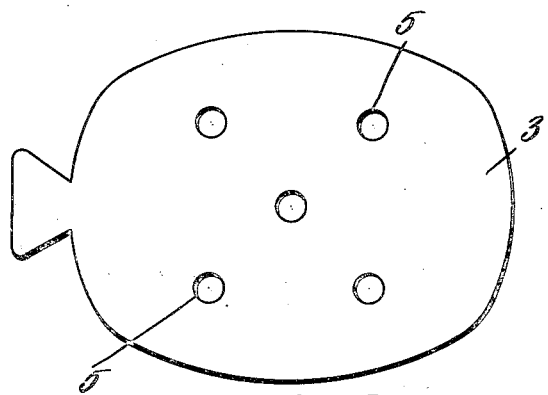
J. L. Kelly AND
C. F. Fenlason Jr.
Inventors
By C. A. Snow & Co.
Attorneys Patented Aug. 3, 1926.

1,595,006

UNITED STATES PATENT OFFICE.

JAMES LYMAN KELLY AND CHARLES FRED FENLASON, JR., OF MALONE, NEW YORK.

METHOD OF MANUFACTURING HOLLOW RUBBER ARTICLES.

Application filed December 3, 1923. Serial No. 678,256.

This invention relates to a method of manufacturing hollow articles of rubber and is especially useful in the formation of seamless cushions, hot water bottles and the like, the opposed walls of which are joined at desired points.

Another object is to provide a method whereby articles of this kind can be formed of sheet rubber cut out in the desired form by dies.

Heretofore articles have been made by vulcanizing together two sheets of rubber and various means have been employed for holding the sheets separated during the vulcanizing process except where they are to be jointed together. In some instances a liquid has been used and in other instances powders such as talc, soapstone, graphite, and the like have been employed. These means have been objectionable, however, because they exert an undesirable pressure against the seam prior to the vulcanizing process and, as a result, the seams often open or are greatly weakened before being vulcanized. Furthermore these methods have prevented the formation of ornamental or other designs on the outer surface of the finished product.

One of the objects of the present invention is to employ a method of holding apart the layers of sheet rubber so that an ornamental or other design can be formed thereon.

With the foregoing and other objects in view the invention consists of certain novel steps in the method hereinafter more fully described, and in certain details of construction which will be hereinafter more fully pointed out and set forth in the appended claim, it being understood that various changes may be made without departing from the spirit of the invention as claimed.

In the accompanying drawings, some of the steps of the process have been illustrated.

In said drawings—

Figure 1 is a section showing two thicknesses of unvulcanized rubber spaced apart, there being a sheet of spacing material resting on the lower layer.

Fig. 2 is a section showing the layers of rubber and spacing material assembled.

Fig. 3 is a section showing the rubber layers after they have been vulcanized together and after the spacing material has been removed from between them.

Fig. 4 is a plan view of a sheet of spacing material that can be used in the manufacture of a hot water bottle or a cushion.

Referring to the figures by characters of reference 1 and 2 designate sheets of rubber cut to desired shape prior to being cured. A spacing sheet 3 made in the shape of the space to be provided within the formed article is placed on one of these sheets 1 so as to lie inwardly from the edges thereof. The two layers of uncured rubber are pressed together where they are unrestrained by the spacing sheet and while thus joined the structure can be inflated and heated so as to be cured.

The spacing sheet is preferably formed of a material which will disintegrate when subjected to the action of water, steam, etc. It has been found desirable to use a composition made up of desired proportions of wood pulp, cotton or other fibers, joined with starch, gelatine or other material readily disintegrated or soluble in water, steam, etc.

In the practical manufacture of rubber articles upper and lower dies are employed and the lower sheet of rubber is placed on the lower die while the upper sheet is placed on the upper die, the spacing sheet being located between. Thus when the two dies are pressed together they will cut out the article from the sheets and as the dies have blunt cutting edges the sheets of rubber will be caused to adhere where they are cut off. In following this process of manufacture care must always be taken to properly position the spacing sheet so that it will not extend too close to the line of cuts made by the dies.

It will be seen that by employing a spacing sheet such as has been described, it is possible to connect the opposed rubber sheets at different points in from the margin thereof as shown at 4, there being openings 5 in the spacing sheet through which the rubber will be pressed. These openings can be of any desired shapes and sizes. By utilizing a filling sheet such as described it will be apparent that different ornamental effects can be produced on the outer surfaces of the rubber article. Likewise the spacing sheet can be provided with suitable ornamental surfaces for producing a desired contour on the formed article.

While the invention has been described as being particularly useful in the formation of rubber cushions, hot water bottles and the like, it will obviously be seen that it can be used in the manufacture of various other articles such as inner tubes of automobile tires, balls, etc.

What is claimed is:—

The herein described method of manufacturing hollow articles of rubber, which consists in placing between layers of uncured rubber which has not been cut to form, a spacer constituting a die or core for shaping the interior of the article, thereafter subjecting the layers of rubber to the action of dies for pressing together those portions of the rubber layers unrestrained by the spacer or core, said dies constituting means for shaping and trimming the layers, next curing the rubber, and finally disintegrating the spacer or core by the action of a fluid and withdrawing it from the formed article, there being an aperture in the spacer through which the uncured layers of rubber are joined when subjected to pressure whereby the resultant article will consist of layers joined together along the margin of the spacer and at a point surrounded by said margin.

In testimony that we claim the foregoing as our own, we have hereto affixed our signatures.

JAMES LYMAN KELLY.
CHARLES FRED FENLASON, Jr.